United States Patent [19]
Gross et al.

[11] 3,859,377
[45] Jan. 7, 1975

[54] SELECTIVE HYDROGENATION OF $C_4$ ACETYLENIC HYDROCARBONS

[75] Inventors: David E. Gross, St. Charles, Mo.; Roland Libers, Dickinson; Claude W. Smalling, Jr., Alvin, both of Tex.

[73] Assignee: Monsanto Company, St. Louis, Mo.

[22] Filed: Dec. 13, 1973

[21] Appl. No.: 424,270

[52] U.S. Cl............................ 260/681.5, 260/677 H
[51] Int. Cl............................................... C07c 7/00
[58] Field of Search.......... 260/681.5, 677 A, 677 H

[56] References Cited
UNITED STATES PATENTS

| | | | |
|---|---|---|---|
| 2,802,889 | 8/1957 | Freuel et al. | 260/677 H |
| 3,113,980 | 12/1963 | Robinson | 260/677 H |
| 3,342,891 | 9/1967 | Poons et al. | 260/681.5 R |
| 3,534,117 | 10/1970 | Clark | 260/681.5 R |
| 3,541,178 | 11/1970 | Nettesheim | 260/681.5 R |
| 3,549,720 | 12/1970 | Wright et al. | 260/677 H |
| 3,674,886 | 7/1972 | Komatsu et al. | 260/677 H |

*Primary Examiner*—Delbert E. Gantz
*Assistant Examiner*—Veronica O'Keefe
*Attorney, Agent, or Firm*—Paul L. Passley; Thomas B. Leslie

[57] ABSTRACT

Selective hydrogenation of $C_4$ acetylenes in admixture with other $C_4$ hydrocarbons including butadiene by liquid phase hydrogenation in which a hydrogen stream diluted to not more than 50 mole percent hydrogen in inert gas is employed as a sole source of hydrogen over a palladium on kieselguhr catalyst in which from .01 to 1.0 weight percent palladium is impregnated to a depth of at least 0.012 inch on a kieselguhr support having macropores of greater than 700 A constituting at least 75 percent of the total pore volume thereof.

10 Claims, No Drawings

SELECTIVE HYDROGENATION OF C$_4$-ACETYLENIC HYDROCARBONS

FIELD OF THE INVENTION

This invention relates to a process for selectively removing acetylenes from C$_4$ hydrocarbon mixtures containing substantial quantities of butadiene by hydrogenation with minimum loss of butadiene and to a catalyst particularly adapted for use in such process.

BACKGROUND OF THE INVENTION

Butadiene, also sometimes referred to as vinylethylene, is derived in large quantities from dehydrogenation of butanes and butenes, as well as from various petroleum refining off gases and from the gaseous products recovered from hydrocarbon cracking operations. Irrespective of the source of the butadiene recovered, it is seldom obtained in the degree of purity required for certain of its uses in the preparation of other organic compounds. Certain impurities which are particularly difficult to separate by the usual fractional distillation techniques are the acetylenic moieties including vinyl acetylene, ethyl acetylene and methyl acetylene, referred to herein as C$_4$-acetylenes. Therefore it has been the practice to hydrogenate the C$_4$ stream containing butadiene and the more highly unsaturated C$_4$-acetylenes, either before or after separation of the more easily separated butanes and butenes therefrom. Such catalytic hydrogenation processes have been carried out both in the vapor and liquid phase and over various hydrogenation catalysts. However, when carried out in either vapor or liquid phase such hydrogenations have resulted in losses of the desired butadiene product by hydrogenation and/or polymerization thereof. In the vapor phase at relatively high temperatures of greater than 300°F there are significant losses to polymerization of butadiene and, consequently, hydrogenation in the liquid phase has come to be somewhat preferred. However, when hydrogenating in the liquid phase the necessity of removing essentially all vinylacetylene ordinarily requires large amounts of hydrogen and has resulted in significant losses of butadiene by hydrogenation to monolefins. Consequently, there have been suggested to the art many specific selective catalysts for increased hydrogenation of the C$_4$-acetylenes with decreased loss through hydrogenation of butadiene. Among the best of such selective hydrogenation catalysts which have been proposed are those containing the noble metals of Group VIII supported on various supports, such as alumina, with or without other metals or their salts as co-catalytic metals.

Previously it has been found that use of a stream of hydrogen gas diluted with inert gases to less than 50 mole percent hydrogen content and preferably less than 35 mole percent hydrogen content has improved the selectivity and concurrently reduced the butadiene loss upon hydrogenation over Group VIII noble metal catalysts.

SUMMARY OF THE INVENTION

It has now been found quite unexpectedly that one particular catalyst out-performs other noble metal selective hydrogenation catalysts when employed in a process for butadiene purification using an inert gas diluted hydrogen stream. The unexpectedly superior selective hydrogenation catalyst comprises palladium on a kieselguhr support wherein from 0.01 to 1.0% by weight palladium is distributed on a kieselguhr support characterized as macroporous, i.e. having a preponderance of pores of greater than 700 A in diameter (macropores) with a minimum of pores smaller than 700 A in diameter (micropores). The catalyst of the present invention used in previously known liquid phase hydrogenation processes with a concentrated stream of hydrogen is not as selective as the best previously known noble metal catalysts. However, when employed in the liquid phase hydrogenation process of the present invention using an inert gas diluted hydrogen stream, this catalyst has been found to be more highly selective than the best previously known hydrogenation catalysts.

DETAILED EMBODIMENTS OF THE INVENTION

As referred to above, highly selective catalysts are required for the selective hydrogenation of acetylenes in olefin streams and particularly of C$_4$-acetylenes in butadiene streams. Although group VIII noble metal catalysts on various supports including alumina, zircon, zirconia and the like have been found to be selective, and the surface impregnated catalysts, which are most preferred, have been found highly selective, still better selectivity is desired. What is sought is substantially complete hydrogenation of the C$_4$-acetylenes with the lowest possible loss of 1,3-butadiene. The through-or partially through-impregnated palladium on kieselguhr catalysts have now been found to be unexpectedly highly selective when used in a process for hydrogenation of the C$_4$-acetylenes employing dilute hydrogen, i.e. a stream of hydrogen diluted with inert gases to less than 50 mol percent, and preferably less than 35 mol percent, hydrogen. The new through- or deep-impregnated palladium catalysts on a particular type of kieselguhr support constitute the surprisingly selective catalyst for this reaction and process.

The kieselguhr support found most suitable for these highly selective catalysts is a kieselguhr possessing a relatively low surface area, from about 0.5 to 20 m$^2$/g, a preponderance, i.e. at least about 75%, and preferably at least about 90% of the total pore volume as macropore volume larger than 700 A, and a concomitant low micropore volume of less than about 25% of the total pore volume. Such kieselguhr supports are available commercially from several sources, either as relatively pure SiO$_2$ as mined products or as subsequently treated to produce various shapes and sizes of support. Some such granules, pellets or extruded shapes have been produced by addition of various amounts of silicate clays such as bentonites as binders or have employed cellulosic binding materials. In some cases, burn-out agents are added and subsequently burned out or calcined to produce the kieselguhr shapes and these are referred to herein as "burned out" kieselguhr supports.

The catalysts useful in the present invention are those having palladium deposited on the above-described kieselguhr supports in amounts of from 0.01 to 1.0% by weight palladium metal on the catalyst composition. The catalysts can also be described as impregnated to a radially dispersed profile, at least partially through-or deep-impregnated, in contrast to those previously known catalysts with high selectivity which were generally of the surface impregnated type, i.e. wherein the catalyst metals are distributed only on or very near the surface of the support, i.e. to a depth of only some 5 to 10 mils. or .005 to .010 inch. It is to be emphasized that the kieselguhr supported catalysts useful in the present invention are not of the "surface-impregnated" type. On the contrary, these kieselguhr supported palladium catalysts are of the "through-impregnated" or partially through-impregnated type, wherein the catalytic metals are distributed to considerable depths or all the way through the support. Through-impregnated catalysts wherein some catalytic metal is present throughout the catalyst granules are useful in the present invention. Most preferably, the surprisingly highly selective catalysts useful in this invention are of the radially dispersed profile impregnated type wherein the catalytic metals are distributed by dispersion distribution to a radial profile of higher concentration near the surface but gradually diminishing concentration toward the center of such support to a depth of from about 300 to 2000 or more microns or 0.012 to 0.08 inch or more, and preferably from about 0.020 to 0.064 inch or 500 to 1600 microns.

These catalysts can be prepared by known processes for impregnating catalyst supports with palladium salts in aqueous solutions. Any of the known palladium salt solutions are suitable for impregnating the kieselguhr supports detailed above. One preferred mode of impregnation is by the so called minimum solution technique which involves impregnating the kieselguhr support with only that solution volume which is totally absorbed while leaving the surface of the support wet. The wet impregnated support is thereafter dried to remove excess solution and calcined at a furnace temperature sufficient to convert the catalytic metal to the oxide form. In the case of palladium, this temperature will usually be at least 300°C.

These impregnated, calcined catalysts are reduced in a stream of hydrogen prior to use also in known manner.

In the conduct of liquid phase hydrogenation reactions of $C_4$-acetylenes there are several different reactor configurations which can be employed of both the down flow and up flow type. It has been found that the improved selectivity of the present invention is realized when the $C_4$ stream and gas feed are contacted in an upflow packed reactor.

Several variables affect the severity of hydrogenation and consequently the losses of desired butadiene along with the hydrogenation of the undesired $C_4$-acetylenes. Amont these temperatures of reaction is most important. The process of this invention can be carried out at temperatures of from 50° to 175°F. However, temperatures higher than 150°F. are generally to be avoided because of increased losses of butadiene due to polymerizing thereof. Likewise, at temperatures below 70°F. improvements in selectivity realized are much smaller. The most preferred temperature conditions for conduct of this improved process are from 80° to 140°F. The pressure under which the reaction is conducted must be sufficient to maintain the $C_4$ hydrocarbons in liquid phase, but does not otherwise critically affect the process. Thus, the pressure may range from about 40 to about 300 psig. The preferred pressure is generally between about 80 and 200 psig. The weight hourly space velocity or WHSV of the liquid $C_4$ hydrocarbons is less than about 50 and preferably within the range of 2 to 35.

In accordance with the present invention the hydrogen required for the hydrogenation of the $C_4$-acetylenes is supplied in gaseous form as a mixture with inert gas or gases containing not more than 50 mole percent of hydrogen. Preferably the hydrogen gas stream contains from about 4 to about 35 mole percent hydrogen. The stream of hydrogen and inert gas is supplied to the reactor in an amount to insure the presence of free gas bubbles in the $C_4$ hydrocarbon stream being hydrogenated. Any gas inert to the hydrogenation reaction and not acting as a catalyst poison may be used to dilute the hydrogen feed stream. Thus, such gases as helium, neon, argon, nitrogen, ethane and methane or mixtures of such gases can be used. Due to their ready availability nitrogen and methane are most preferred for reasons of economy.

Likewise, a hydrogen stream of any purity may be diluted with additional inert gases to form the diluted hydrogen feed stream. It is only necessary that the hydrogen be free of any known catalyst poisons, such as hydrogen sulfide and other sulfur compounds which would generate hydrogen sulfide. Carbon monoxide is likewise known as a temporary poison for palladium catalysts and should not be allowed to exceed 20 parts per million in the hydrogen gas stream. If such concentration is exceeded it may be reduced by a catalytic methanation reaction in well-known manner. Any readily available source of hydrogen gas is suitable for use so long as the presence of the known catalyst poisons are avoided. Such streams are commonly available in refining and petrochemical plants and can be freed of poisons by known treatments if required.

Also, the presence of oxygen or air is to be avoided during the reaction and any contact with oxygen or air by the $C_4$ hydrocarbon stream containing a high concentration of butadiene. Butadiene peroxides are known to be explosive when in dry form and likewise to be formed by oxidation of liquid butadiene. Oxidation inhibitors such as tertiary butylcatechol are commonly employed in streams with a high concentration of butadiene, and such inhibitors are desirably present in the $C_4$ hydrocarbon stream treated by the present invention. It is also good practice to blanket any such butadiene-containing mixture with inert gas when stored. It is likewise preferred that a vapor pressure of inert gas be maintained when said $C_4$ hydrocarbon streams are subjected to treatment such as hydrogenation. The present invention is especially suited to this objective, since by feeding a diluted hydrogen stream containing a major proportion of such inert gas or gases the desired vapor pressure of inert gas is present at all times during the hydrogenation reaction.

The amount of such diluted hydrogen-inert gas feed charged to the hydrogenation reaction will vary with the activity and age of the particular catalyst employed, the degree of selectivity and degree of hydrogenation of the $C_4$-acetylenes desired. The process of this invention can be carried out with an amount of hydrogen ranging from about 0.5 to 8 mole percent of the total $C_4$ hydrocarbon stream or in a mole ratio of 0.005 to 0.08. Preferably this amount is maintained at about 0.008 to 0.06 mole ratio to the $C_4$ hydrocarbons treated. If greater quantities of hydrogen are available it usually results in increased hydrogenation and loss of butadiene present and thus a decline in the selectivity of the process, even though the selectivity is greatly improved over that realized when charging the same amounts of undiluted hydrogen to the reaction.

The process of the present invention can be applied to the various $C_4$ hydrocarbon streams containing varying amounts of butadiene as well as varied amounts of $C_4$-acetylenes which it is desired to reduce by hydrogenation. Generally, it is preferred to treat a stream of relatively concentrated butadiene and butylenes with small amounts of butanes and butenes and relatively small amounts of the $C_4$-acetylenes, vinyl acetylene, ethyl acetylene and methyl acetylene. A typical mixed $C_4$ hydrocarbon stream composition suitable for treatment by this invention is set out below:

|  | Percent by Weight |
| --- | --- |
| isobutane | 2 – 3 |
| n-butane | 3 – 4 |
| butylenes | 42 – 48 |
| t-butene-2 | 6 – 8 |
| c-butene-2 | 4 – 7 |
| 1,3 butadiene | 34 – 38 |
| vinyl acetylene | 0.1 – 1.0 |
| ethyl acetylene | 0.05 – 0.5 |
| methyl acetylene | 0.001 – 0.01 |

The process of the present invention is carried out at a severity of hydrogenation sufficient to reduce the concentration of vinyl acetylene to not more than 100 parts per million and preferably to not more than 50 ppm, thus hydrogenating from about 95 to 99+ percent of that compound present in the mixed $C_4$ hydrocarbon feed stream. Concurrently, the concentration of ethyl acetylene is reduced to not more than 600 ppm and preferably not more than 300 ppm, thus hydrogenating from 40 to 80 percent of that compound, while the methyl acetylene present in much smaller quantities is reduced to less than 30 ppm. The trace amounts of vinyl acetylene, ethyl acetylene and methyl acetylene remaining in a hydrogenated $C_4$ hydrocarbon stream can be removed from the desired butadiene product by the distillation or extraction and distillation processes to which the $C_4$ concentrate is normally subjected for the recovery of butadiene product. These compounds will concentrate in the bottom of the distillation column and be separated in this manner from the butadiene distilled overhead, with or without a previous extraction step.

The present invention is adapted for use with $C_4$ hydrocarbon streams derived from a variety of sources. One of the several advantages realized in the present process is that the hydrogenation has been found to tolerate quantities of water in the feed hydrocarbon stream which had previously been found to inactivate selective hydrogenation catalysts. With the palladium on kieselguhr catalysts employed in the present invention it has been found that water can be tolerated in amounts of up to several percent by weight based on the feed stream with no loss in selectivity or conversion experienced. Therefore, although it is deemed good practice and desirable to provide for the separation of any entrained water from this $C_4$ hydrocarbon feed stream, it is not essential to do so.

In normal practice of the present process the gaseous portion of effluent from the top of the upflow reactor is cooled to condense any liquid product and the condensed liquid separated therefrom. The gases are then recompressed and recycled to the reactor after any inert gas and the required fresh hydrogen make-up is added to that gas stream. The liquid reaction product withdrawn in the upper portion of the reactor above the catalyst bed is combined with the liquid condensed from the overhead gases and passed to a flash tank where any remaining inert gas separates and is passed to other processing or disposed of. The liquid hydrogenated $c_4$ hydrocarbon stream from this flash tank can be subjected to any desired process for recovery of the desired butadiene product and other $C_4$ hydrocarbons. These recovery procedures, which involve precise fractional distillation or more commonly extractive distillation of the butadiene product into well-known solvents such as furfural, acetonitrile, or the like, followed by distillation thereof from the rich solvent are well-known and need not be described in detail.

After extended periods of use in a continuous hydrogenation reaction the activity of the palladium on kieselguhr selective hydrogenation catalysts will be gradually reduced and likewise the selectivity thereof. When this occurs the activity and selectivity of the catalysts can be regenerated by subjecting them to any of several regeneration procedures. These include stripping with concentrated hydrogen, washing with acetone followed by hydrogen treating, and by calcining in air diluted with nitrogen or steam. The details of such regeneration procedures are known and will not be described in detail.

The manner of application of this invention is more fully illustrated in the Examples set out below.

CATALYST PREPARATION

EXAMPLE A

The catalysts used in Examples I thru IV were prepared by a procedure of minimum solution impregnation utilizing an aqueous solution of palladium nitrate hydrate to supply the required weight of the metal salt diluted with water to form a volume of solution sufficient to comprise a 6 percent excess over the predetermined water-absorptivity of the kieselguhr support.

Catalyst A, containing 0.2 wt.% palladium, was prepared by dissolving 0.267 grams of Pd $(NO_3)_2 \cdot 3H_2O$ in water, diluting the solution to 34.5 ml. and stirring the solution with 50 g. of 8 × 14 mesh granules of burned-out kieselguhr (Celite 410, Burned Out). Thereafter the impregnated support was dried in a forced air oven at 120°C. for 6 hours and then calcined in a muffle furnace for 3 hours at 300°C.

Catalyst B was prepared to have 0.5 wt. % palladium on the same 8 × 14 mesh kieselguhr support as above in the same manner or outlined employing a more concentrated impregnating solution of palladium nitrate hydrate.

Catalyst C was prepared to have 0.05 wt. % palladium on the same 8 × 14 mesh kieselguhr support by employing a more dilute impregnating solution of palladium nitrate hydrate.

Catalysts D and E were prepared to have 0.2 wt.% palladium on 3/16 inch granules of respectively non-burned out and burned out kieselguhr (Celite 410 and Celite 410 Burned Out). Catalyst F was prepared on 3/16 × ¼ inch solid kieselguhr extrudate to have 0.2 wt.% palladium thereon. Solutions of 0.16 g. of Pd $(NO_3)_2 \cdot 3H_2O$ for each 50 cc (30 g.) sample of support were diluted to a 6% excess of volume of liquid over the predetermined water absorptivity of each sample, were thoroughly mixed with each support sample, dried, and calcined as above. Each of the above catalysts was reduced in a 10% stream of hydrogen in helium for 3 hours at 300°C. prior to use.

EXAMPLE B

Catalyst G used in Example V was also prepared in large quantity by a similar minimum solution impregnation method employing an aqueous solution of Pd $(NO_3)_2 \cdot 3H_2O$. In this instance 5000 grams of the 3/16 diameter by ¼ inch long kieselguhr extrudate (Celite 408) was placed in a mixer and sprayed with 2170 mls. of palladium nitrate hydrate solution, i.e. 216.4 ml. of a 10% aqueous solution diluted to 2170 mls. The damp impregnated support was transferred to screen trays and dried overnight in a forced air oven at 120°C. Thereafter the dried catalyst was calcined for 3 hours in a muffle furnace at 300°C. The actual assay of the finished catalyst was 0.22 wt.% palladium. The catalyst was reduced for 3 hours at 300°C. in a stream of 10% hydrogen and 90% helium prior to use.

A sample of Catalyst G was characterized by various physical properties. Such properties also apply to the catalysts prepared in Example A, since the nature of the kieselguhr support is the same except for those supports which have been burned out to somewhat decrease their density. Catalyst G was found to have a particle density of 1.023 g/cc determined by mercury displacement and a true density of 2.39 g/cc, as determined by deducting the volume of the pores as determined by helium displacement from the particle density. The total pore volume of the sample determined as above was 0.560 cc/g. of which 0.533 cc/g. constituted macropores of greater than 700 A diameter and 0.027 cc/g. constituted micropores of less than 700 A diameter. The surface area of the catalyst was between 2 and 5 $M^2/g$. The concentration profile of palladium metal through the support pellets was determined by electron microprobe analysis and it was found that Pd metal was deposited to depths of from 700 to 1100 microns, averaging about 800 microns, or 0.031 inch below the exterior surface of the support pellet.

In the following examples the analysis of the feed $C_4$ hydrocarbon streams, the product hydrogenated $C_4$ hydrocarbon streams and the hydrogenating gas stream, whether or not diluted with inert gases, was done by gas chromatography. This was carried out for the reaction product stream by taking a small split stream of the reaction product at reactor outlet pressure and transmitting it directly to the sample valve of a gas chromatograph. Normally, four analyses were averaged to test one condition.

In Examples I through IV the runs were conducted in a hydrogenation reactor unit constructed of stainless steel and composed of a preheater coil of 12 feet of ¼ inch tubing which led into the bottom of the reactor comprising a 15 inch tube of ¾ inch diameter. The reactor contained approximately 25 ml. of a selective hydrogenation catalyst supported at the center of the reactor by alundum heat exchange balls. Both the preheater coil and tubular heater were immersed in a constant temperature bath. Prior to each run the equipment was purged with nitrogen to exclude air. The $C_4$ fraction feed was fed by a metering pump and mixed with controlled amounts of hydrogen and, where indicated, the indicated gaseous diluent, and thereupon passed through the preheater coil to the bottom of the tubular reactor. The system pressure was maintained by an automatic pneumatic pressure control device. The product stream, with the exception of the small split stream directed to the gas chromatograph, was passed to a liquid gas separator at the same pressure as the reactor for separation of inert gases. Thereafter, the liquid product stream was passed through a pressure let-down valve and thence, at atmospheric pressure, to a small distillation column for separation of the gaseous $C_4$ products from any traces of oils formed in the process. The length of the test runs was several hours in general.

In Examples I through IV below, a $C_4$ hydrocarbon stream of the following composition was hydrogenated:

| | Wt. Percent | |
|---|---|---|
| i-butane | 2.6 | |
| n-butane | 3.5 | |
| butylenes | 45.5 | |
| t-butene-2 | 7.0 | |
| c-butene-2 | 5.3 | |
| 1,3-butadiene | 35.8 | |
| vinyl acetylene | 0.22 | (2200 ppm) |
| ethyl acetylene | 0.08 | (800 ppm) |

EXAMPLE I

In this example this very surprising and unexpectedly superior selectivity of the palladium on kieselughr catalysts employed in the present invention is illustrated with reference to Catalyst A when compared to one of the superior hydrogenation catalysts of the prior art, a surface impregnated palladium on alumina catalyst having palladium in the amount of 0.3% by weight deposited on the outer surface only of an alumina support in the form of ⅛ by ½ inch alumina cylinders, Catalyst P. Runs were conducted in the reaction apparatus described above at 120°F. at a pressure of 130 psig. with a hydrogen gas stream of varying composition from 100% hydrogen to quite dilute with helium or nitrogen as the diluent gases. The results of the hydrogenation reactions conducted with 100 percent hydrogen gas stream are reported in Table A and those with dilute hydrogen gas streams in Table B below.

TABLE A

| Runs 1 – 6 | 1 | 2 | 100% $H_2$ 3 | 4 | 5 | 6 |
|---|---|---|---|---|---|---|
| WHSV | 30 | 30 | 30 | 12 | 18 | 24 |
| $H_2$/HC Moles | .027 | .025 | .025 | .027 | .027 | .027 |
| Catalyst | P | P | P | A | A | A |
| Vinyl Acetylene Reduction % | 99.0 | 99.0 | 98.5 | 97.0 | 95.3 | 93.1 |
| Ethyl Acetylene Reduction % | 76.0 | 77.3 | 74.0 | 75.4 | 71.2 | 65.0 |
| 1,3-Butadiene Loss % | 3.9 | 3.7 | 3.7 | 5.51 | 4.92 | 4.25 |

TABLE B

| Runs 7 – 12 He Diluted | 7 | 8 | Dilute $H_2$ 9 | 10 | 11 | 12 |
|---|---|---|---|---|---|---|
| WHSV | 15.8 | 24.5 | 19 | 24 | 24 | 24 |
| $H_2$/HC Moles | .047 | .046 | .027 | .023 | .019 | .017 |
| Catalyst | P | P | P | A | A | A |
| $H_2$ Purity % | 16 | 17.5 | 10.7 | 10.0 | 10.0 | 9.0 |
| Vinyl Acetylene Reduction % | 98.7 | 98.5 | 99.2 | 99.5 | 96.7 | 94.7 |
| Ethyl Acetylene Reduction % | 72.0 | 71.0 | 68.6 | 71.2 | 53.7 | 53.1 |
| 1,3-Butadiene Loss % | 3.2 | 2.8 | 4.3 | 2.01 | 0.96 | 1.83 |

| Runs 13 – 17 $N_2$ Diluted | 13 | 14 | 15 | 16 | 17 |
|---|---|---|---|---|---|
| WHSV | 24 | 9 | 7.5 | 24 | 8.5 |
| $H_2$/HC Moles | .025 | .027 | .074 | .026 | .044 |
| Catalyst | A | A | A | A | A |
| $H_2$ Purity % | 11.0 | 5.0 | 20.0 | 11.6 | 7.2 |
| Vinyl Acetylene Reduction % | 97.6 | 94.0 | 97.9 | 98.1 | 96.6 |
| Ethyl Acetylene Reduction % | 64.7 | 47.6 | 58.8 | 66.1 | 54.8 |
| 1,3-Butadiene Loss % | 1.82 | 1.67 | 1.76 | 1.98 | 1.74 |

EXAMPLE II

In this Example, there is illustrated the effect of using Catalyst B with 0.5 wt. percent palladium and Catalyst C with 0.05 wt. percent palladium on the same 8 by 14 mesh kieselguhr support granules described in Example A for hydrogenation of the same $C_4$ hydrocarbon stream as described in Example I above. Runs were conducted at 120° to 125°F. and 130 psig. pressure and the hydrogen gas stream diluted to a hydrogen concentration of from 8 to 10 percent. The results of these hydrogenations are set out in Table II A for Catalyst B and Table II B for Catalyst C below.

TABLE II-A

| Run | Catalyst B 1 | 2 |
|---|---|---|
| WHSV | 24 | 24 |
| $H_2$/HC Moles | .021 | .020 |
| Hydrogen Purity % | 9.3 | 8.9 |
| Vinyl Acetylene Reduction % | 99.0 | 97.9 |
| Ethyl Acetylene Reduction % | 68.3 | 61.7 |
| 1,3-Butadiene Loss % | 2.03 | 2.32 |

TABLE II-B

| Run | Catalyst C 3 | 4 | 5 |
|---|---|---|---|
| WHSV | 12 | 12 | 12 |
| H2/HC Moles | .019 | .022 | .017 |
| Hydrogen Purity % | 10.0 | 8.3 | 9.3 |
| Vinyl Acetylene Reduction % | 98.9 | 99.4 | 99.4 |
| Ethyl Acetylene Reduction % | 62.2 | 70.6 | 62.9 |
| 1,3-Butadiene Loss % | 2.51 | 2.74 | 2.27 |

EXAMPLE III

In this example, the use of the palladium on kieselguhr support catalysts of differing shapes is illustrated through hydrogenation with Catalysts D, E and F described in Example A and the hydrogenation of the same $C_4$ hydrocarbon stream as described in Example I above. The runs were conducted at approximately 100° to 125°F. and 130 psig. pressure. The hydrogen gas stream was varied from 6 to 13 percent hydrogen concentration. The results for Catalysts D and E are set in Table III–A and for Catalyst F in Table III–B below.

TABLE III-A

| Run | 1 | 2 | 3 | 4 | 5 |
|---|---|---|---|---|---|
| WHSV | 18 | 18 | 18 | 18 | 18 |
| $H_2$/HC Moles | .011 | .021 | .021 | .023 | .024 |
| Catalyst | D | D | E | E | E |
| Hydrogen Purity | 6.4 | 11.3 | 11.3 | 12.3 | 13.0 |
| Vinyl Acetylene Reduction % | 98.6 | 98.3 | 98.3 | 99.4 | 98.0 |
| Ethyl Acetylene Reduction % | 66.3 | 64.3 | 63.1 | 70.2 | 62.3 |
| 1,3-Butadiene Loss % | 2.45 | 2.35 | 2.09 | 2.50 | 2.14 |

TABLE III-B

| Run | 6 | 7 | 8 | 9 |
|---|---|---|---|---|
| WHSV | 12 | 12 | 9 | 9 |
| $H_2$/HC Moles | .023 | .025 | .020 | .020 |
| Catalyst | F | F | F | F |
| Hydrogen Purity % | 9.1 | 9.5 | 8.2 | 8.2 |
| Vinyl Acetylene Reduction % | 98.4 | 99.0 | 99.2 | 99.0 |
| Ethyl Acetylene Reduction % | 68.0 | 71.3 | 72.8 | 70.7 |
| 1,3-Butadiene Loss % | 1.98 | 1.97 | 2.70 | 2.66 |

EXAMPLE IV

In this Example, the maintenance of the selectivity of the specific palladium on kieselguhr catalysts of the present invention in the presence of moisture is illustrated by hydrogenation of the same $C_4$ hydrocarbon stream as described in Example I above when employing Catalyst A described in Example A. The runs were conducted at 130°F. and 130 psig. The hydrogen gas stream diluted with nitrogen was varied in concentration from 10 to 12.5 percent. Catalyst A was respectively dry as prepared or noticeably damp with water fed with the $C_4$ hydrocarbon stream at a rate of approximately 3 percent by weight of the hydrocarbon charge as indicated.

separator to a recycle gas compressor to restore the gases to system pressure. Thereafter the compressed gas stream was cooled in a heat exchanger with cooling water feed and passed to a final separation vessel at existing pressure where any condensed liquid product was separated and combined with product from the liquid-gas separator. Additions of inert gas, usually nitrogen, and sufficient makeup hydrogen containing less than 10 ppm of carbon monoxide were made to the recycled gas stream from the liquid-gas separator to supply that consumed in the reactor. After a small split stream directed to a gas chromatograph for analysis, the recycled gas stream is then recycled to the gas inlet port of the tubular reactor under flow control. Fresh $C_4$ hydro-

TABLE IV

| Run | 1 | 2 | 3 | 4 | 5 | 6 | 7 |
|---|---|---|---|---|---|---|---|
| WHSV | 12 | 12 | 12 | 12 | 12 | 12 | 12 |
| $H_2$/HC Moles | .028 | .028 | .025 | .022 | .028 | .028 | .028 |
| Hydrogen Purity | 12.4 | 12.4 | 11.3 | 10.0 | 12.4 | 12.4 | 12.4 |
| Vinyl Acetylene Reduction % | 98.3 | 97.4 | 98.5 | 97.5 | 98.2 | 98.5 | 98.9 |
| Ethyl Acetylene Reduction % | 63.0 | 58.5 | 60.0 | 58.1 | 66.2 | 64.0 | 69.5 |
| 1,3-Butadiene Loss % | 1.7 | 1.66 | 1.59 | 1.30 | 2.53 | 2.05 | 2.49 |
| Water Present (Catalyst Wet) | No | Yes | Yes | Yes | No | Yes | Yes |

EXAMPLE V

A continuous hydrogenation system adapted for continuous operation over very extended periods was constructed and hydrogenations carried out therewith. The system consisted of shell and tube heat exchanger in the $C_4$ hydrocarbon feed line supplied with steam at 50 psig. to the shell for preheating the $C_4$ feed stream to the desired charging temperature, a tubular reactor constructed of carbon steel 3 inches in diameter and associated gas-liquid separation, recycling and recovery equipment. The tubular reactor was packed with 18 inches of ¼ inch Intalox saddles and four feet of Catalyst G described in Example B above, comprising 0.22 weight percent palladium impregnated onto a 3/16 inch diameter kieselguhr extrudate. The tubular reactor was provided with a bottom feed port for the $C_4$ hydrocarbon feed line and a side feed port above the bottom for the hydrogen and inert recycled gas feeds. From the tubular reactor the reaction product was passed to a product liquid-gas separator at approximately the system pressure and free inert gases separated from the liquid hydrogenated $C_4$ hydrocarbon product. The liquid hydrogenated product was drawn off from the bottom of the separator, and blended with the feed to a butadiene recovery unit. A small split stream was taken from the separator product stream to a gas chromatograph for analysis of the liquid hydrogenated product. The inert gas mixture was passed from the top of the separator to a recycle gas compressor to restore the carbon feed was continuously supplied to the reactor liquid inlet port on flow control.

Using the above continuous hydrogenation reaction system a continuous hydrogenation was conducted for several hundred hours. During this period, variations in the flow rate and composition of the hydrogenation gas feed over a wide range were made. The $C_4$ hydrocarbon stream subjected to hydrogenation had the following approximate composition.

| $C_4$ Feed Stream, Wt. % | | |
|---|---|---|
| i-Butane | 2.54 | ± 0.6 |
| n-Butane | 3.12 | ± 0.35 |
| Butylenes | 45.40 | ± 1.53 |
| t-Butene-2 | 7.30 | ± 1.36 |
| c-Butene-2 | 5.50 | ± 1.3 |
| 1,3-Butadiene | 35.88 | ± 0.45 |
| Vinyl Acetylene | 0.1900 | ± 0.0280 |
| Ethyl Acetylene | 0.076 | ± 0.0084 |

The above $C_4$ feed stream was charged to the tubular reactor at a rate to produce the indicated WHSV at inlet temperatures of from about 75° to 100°F. The system pressure was maintained 129± 2 psig. with a reactor inlet pressure about 5 psig. higher.

The results of the continuous hydrogenation reaction as determined between 196 and 660 hours on stream are set forth in Table V below.

TABLE V

| Hours on Stream | 196 | 246 | 263 | 464 | 602 | 632 | 655 | 656 |
|---|---|---|---|---|---|---|---|---|
| WHSV | 10.0 | 18.6 | 18.6 | 18.6 | 18.6 | 18.6 | 18.6 | 18.6 |
| $H_2$/HC Mol Ratio | .064 | .056 | .056 | .064 | .069 | .048 | .023 | .023 |
| Mol % $H_2$ in Gas | 11.4 | 17.6 | 18.0 | 20.4 | 21.5 | 67.9 | 48.6 | 34.1 |
| Inlet Temp °F. | 93 | 91 | 76 | 104 | 98 | 92 | 102 | 73 |
| Ethyl Acetylene Reduction % | 77.2 | 76.3 | 68.0 | 70.6 | 73.2 | 98.7 | 77.1 | 58.8 |
| Vinyl Acetylene Reduction % | 99.4 | 96.8 | 93.6 | 94.2 | 96.5 | 99.9 | 95.6 | 85.8 |
| 1,3-Butadiene Loss % | 2.67 | 2.70 | 2.06 | 2.17 | 2.97 | 8.57 | 3.83 | 2.26 |

As can be seen from the above Table V the selectivity of Catalyst G under continuous operating conditions was quite satisfactory at all the varied concentrations of hydrogen in the recycled gas stream below approximately 50 mole percent. However, the period at 632 hours on stream with the hydrogen concentration in the recycled gas stream raised to 67.9 mole percent illustrates the unsatisfactory results with such concentrated hydrogen in the hydrogenating recycled gas stream when the loss of 1,3-butadiene increased to 8.57 percent. The lower conversion of vinyl acetylene at the 656 hour point is somewhat indicative of gradually diminishing catalyst activity at the very low inlet temperature there maintained.

What is claimed is:

1. A process for the selective hydrogenation of $C_4$ acetylenes in admixture with butadiene in the liquid phase which comprises reacting said $C_4$ hydrocarbon mixture with a stream of hydrogen diluted to not more than 50 mole percent hydrogen in inert gas in concurrent upflow reaction over a catalyst comprising from 0.01 to 1.0 weight percent palladium impregnated to a depth of at least 0.12 inch on a kieselguhr support having a surface area of from 0.5 to 20 m²/g and a volume of macropores greater than 700 A in diameter of at least 75% of total pore volume of said support at a temperature of from 50° to 175°F and under a pressure sufficient to maintain the $C_4$ hydrocarbon mixture substantially in liquid phase.

2. The process of claim 1 wherein said catalyst comprises from 0.01 to 1.0 weight percent palladium impregnated to a depth of from about 0.020 to 0.064 inch on a kieselguhr support having a surface area of from 0.5 to 20 m²/g and a volume of macropores greater than 700 A in diameter of at least 75% of total pore volume of said support.

3. The process of claim 1 wherein said catalyst comprises from 0.01 to 1.0 weight percent palladium impregnated to a depth of from about 0.020 to 0.064 inch on a kieselguhr support having a surface area of from 0.5 to 20 m²/g and a volume of greater than 700 A in diameter of at least 90% of total pore volume of said support.

4. The process of claim 1 wherein said catalyst comprises from 0.05 to 0.5 weight percent palladium impregnated to a depth of from 0.020 to 0.064 inch on a kieselguhr support having a surface area of from 0.5 to 20 m²/g and a volume of macropores greater than 700 A in diameter of at least 90% of total pore volume of said support.

5. The process of claim 1 wherein said $C_4$ hydrocarbon mixture is reacted with said stream of diluted hydrogen at a temperature of from 50° to 150°F. at a pressure of from 40 to 300 psig and a liquid weight hourly space velocity of less than about 50.

6. The process of claim 1 wherein said $C_4$ hydrocarbon mixture is reacted with said stream of diluted hydrogen at a temperature of from 80° to 140°F, at a pressure of from 80 to 200 psig and a liquid weight hourly space velocity of from 2 to 35.

7. The process of claim 1 wherein the said stream of diluted hydrogen has a hydrogen content of from 4 to 35 mole percent.

8. The process of claim 1 wherein the inert gas is selected from the group consisting of helium, neon, argon, nitrogen, methane and ethane.

9. The process of claim 1 wherein the said hydrogen is present in a mole ratio of from 0.005 to 0.08 to the said $C_4$ hydrocarbon mixture.

10. The process of claim 1 wherein the said hydrogen is present in a mole ratio of from 0.008 to 0.06 to the said $C_4$ hydrocarbon mixture.

* * * * *